Oct. 2, 1928.
A. MILLER
1,686,099
POULTRY COOP UNLOADER
Filed Sept. 22, 1927
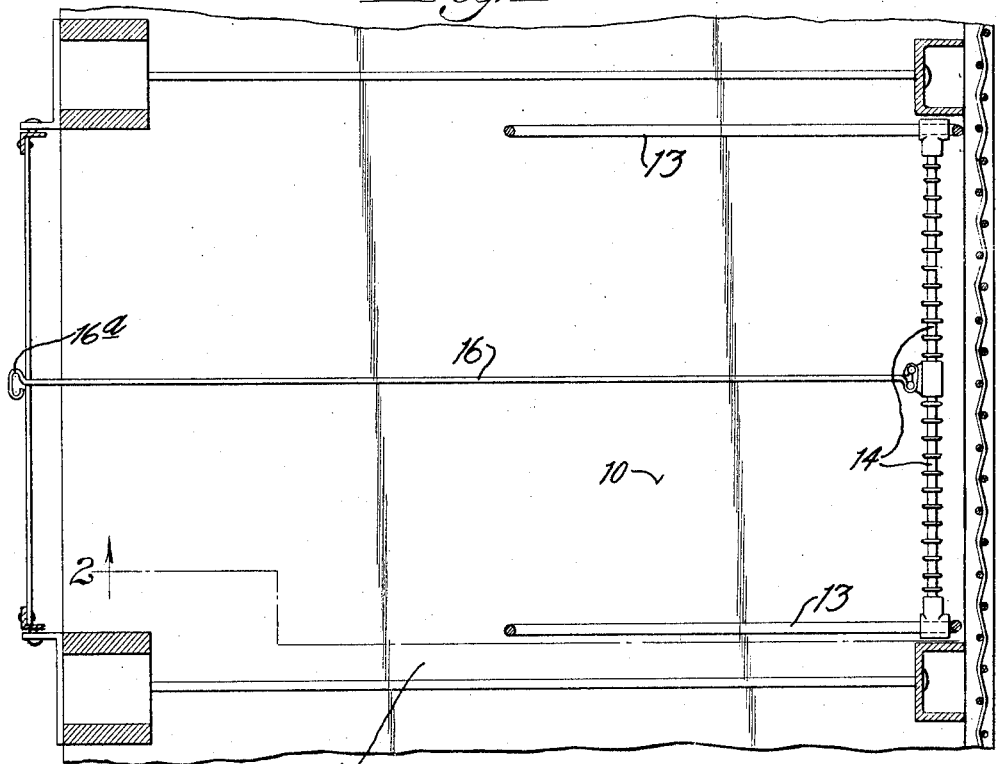
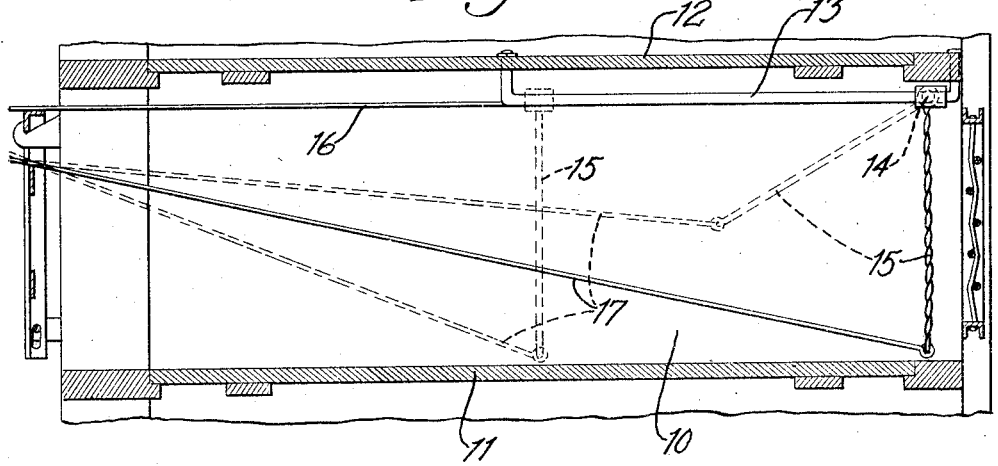
Inventor,
Arthur Miller,
By Dyrenforth, Lee, Chritton & Wiles,
Attys.

Patented Oct. 2, 1928.

1,686,099

UNITED STATES PATENT OFFICE.

ARTHUR MILLER, OF CHICAGO, ILLINOIS.

POULTRY-COOP UNLOADER.

Application filed September 22, 1927. Serial No. 221,363.

This invention relates to improvements in poultry coop unloaders, and more especially to such an unloader particularly adapted for use in the coops of a poultry car.

Coops in a poultry car frequently have relatively low ceilings and are rather deep so that it is difficult to remove therefrom eggs, poultry or refuse. By the use of my invention, any objects in the coop may be pulled from the back of the coop toward the front to make them readily accessible to an employee standing in the aisle of the car. Any coop may be quickly and readily unloaded without requiring a caretaker to crawl into the same as heretofore has been necessary.

In that form of device embodying the features of my invention shown in the accompany drawings. Figure 1 is a top plan view of a coop and Fig. 2 is a view taken as indicated by the line 2 of Fig. 1.

As shown in the drawings, 10 indicates the coop, 11 the floor and 12 the ceiling. 13, 13 indicate a pair of guide bars suitably supported adjacent the ceiling. 14 indicates a partition supporting rod having its ends slidably mounted on the guide rods 13. The partition supporting rod 14 carries a screen partition 15, the partition being hingedly mounted at its upper edge on said rod 14.

To the center part of the rod 14 is attached an operating rod 16 extending out through the front of the coop and provided with a handle 16ª. Another rod 17 is attached to the lower edge of the partition 15 and likewise extends out through the front of the coop.

The partition 15 is normally located in a vertical position at the outer end of the coop as shown in solid lines in Fig. 2. If it is desired to move anything in the coop toward the front end, the partition may be slid forward, by pulling on the rods 16 and 17, to the vertical position shown in broken lines in Fig. 2. This will serve to bring the contents of the coop forward where they are accessible to a caretaker. If desired, the lower edge of the screen 15 may be swung to a substantially horizontal position adjacent the ceiling of the coop by pulling on the rod 17 alone.

While I have shown and described certain embodiments of my invention, it is to be understood that it is capable of many modifications. Changes, therefore, in the construction and arrangement may be made without departing from the spirit and scope of the invention disclosed in the appended claims, in which it is my intention to claim all novelty in my invention as broadly as possible in view of the prior art.

What I claim is new, and desire to secure by Letters Patent, is:

1. A poultry coop unloader comprising a partition slidably and hingedly mounted at its upper edge in the coop and normally located in a vertical position at the outer end of the coop, means for sliding said partition toward the inner end of said coop to move the contents forward, and means for swinging said partition from a normal vertical position to a substantially horizontal position adjacent the ceiling of the coop.

2. A poultry coop unloader comprising a screen partition slidably and hingedly mounted at its upper edge in the coop and normally located in a vertical position at the outer end of the coop. means for sliding said partition toward the inner end of said coop to move the contents forward, and means for swinging said partition from a normal vertical position to a substantially horizontally position adjacent the ceiling of the coop.

3. A poultry coop unloader comprising a pair of guide rods adjacent the ceiling of a coop, a partition supporting rod having its ends slidably mounted on said guide rods, a partition hingedly mounted at its upper edge on said partition supporting rod, means for sliding said partition supporting rod on said guide rods, and means for swinging said partition on said partition supporting rod.

In witness whereof, I have hereunto set my hand, this 16th day of September, 1927.

ARTHUR MILLER.